United States Patent
Milojicic (10) Patent No.: US 11,075,801 B2
(45) Date of Patent: Jul. 27, 2021

(54) SYSTEMS AND METHODS FOR RECONFIGURATION CONTROL USING CAPABILITIES

(71) Applicant: Hewlett Packard Enterprise Development LP, Houston, TX (US)

(72) Inventor: Dejan S. Milojicic, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 15/955,657

(22) Filed: Apr. 17, 2018

(65) Prior Publication Data

US 2019/0319838 A1 Oct. 17, 2019

(51) Int. Cl.
*H04L 12/24* (2006.01)
*G06F 9/50* (2006.01)
*G06F 12/14* (2006.01)
*H04L 29/06* (2006.01)

(52) U.S. Cl.
CPC ........ *H04L 41/0813* (2013.01); *G06F 9/5077* (2013.01); *G06F 9/5083* (2013.01); *G06F 12/1491* (2013.01); *H04L 63/02* (2013.01); *H04L 63/10* (2013.01)

(58) Field of Classification Search
CPC ..... H04L 41/0813; H04L 63/02; H04L 63/10; H04L 41/0806; H04L 43/045; H04L 41/5032; H04L 63/101; H04L 67/125; H04L 41/5012; H04L 43/0864; H04L 43/0888; G06F 9/5077; G06F 9/5083;
(Continued)

(56) References Cited

U.S. PATENT DOCUMENTS

| 6,240,172 B1* | 5/2001 | Zhu | H04M 1/247 379/110.01 |
| 8,677,318 B2 | 3/2014 | Mohindra et al. | |
| 9,135,029 B2 | 9/2015 | Dasari et al. | |

(Continued)

OTHER PUBLICATIONS

Miltos D. Grammatikakis et al: "Security in MPSoCs: A NoC Firewall and an Evaluation Framework", Aug. 2015, IEEE, IEEE Transactions on Computer-Aided Design of Integrated Circuits and Systems, vol. 34, No. 8, pp. 1344-1357 (Year: 2015) (Year: 2015).*

(Continued)

*Primary Examiner* — Ninos Donabed
(74) *Attorney, Agent, or Firm* — Sheppard Mullin Richter & Hampton LLP (57) ABSTRACT

Systems and methods for system reconfiguration of a computing system that includes a plurality of memory and computing resources, may include: assigning a reconfiguration capability to a user, the reconfiguration capability granting the user a right to reconfigure at least one of memory and computing resources in the computing system; a controller of the computing system receiving a reconfiguration request from a user for a requested system reconfiguration along with that user's configuration capability; the controller of the computing system verifying that the user from which the reconfiguration request was received has the rights to make the requested system reconfiguration; and the controller of the system executing the requested system reconfiguration if the user has the rights to make the requested system reconfiguration.

20 Claims, 7 Drawing Sheets

(58) Field of Classification Search
CPC .. G06F 12/1491; G06F 3/04817; H04W 4/50; H04W 8/22; G06Q 20/40
See application file for complete search history.

(56) References Cited

U.S. PATENT DOCUMENTS

| | | | | |
|---|---|---|---|---|
| 9,166,878 | B1* | 10/2015 | Cook | H04L 43/0817 |
| 9,172,621 | B1* | 10/2015 | Dippenaar | H04L 41/18 |
| 9,645,840 | B2* | 5/2017 | Ennaji | G06F 9/45533 |
| 2003/0236854 | A1* | 12/2003 | Rom | H04L 47/822 709/217 |
| 2006/0294580 | A1* | 12/2006 | Yeh, Jr. | H04L 63/20 726/3 |
| 2009/0172148 | A1* | 7/2009 | Underwood | H04L 12/66 709/224 |
| 2010/0177735 | A1* | 7/2010 | Bihannic | H04N 21/41407 370/331 |
| 2011/0145831 | A1* | 6/2011 | Imura | G06F 9/5077 718/104 |
| 2011/0167441 | A1* | 7/2011 | Xia | H04N 21/2381 725/25 |
| 2011/0197254 | A1* | 8/2011 | Sallaka | G06F 21/6218 726/1 |
| 2011/0239126 | A1* | 9/2011 | Erickson, Jr. | H04L 41/22 715/744 |
| 2012/0324090 | A1* | 12/2012 | Gu | H04L 67/1097 709/223 |
| 2013/0054810 | A1* | 2/2013 | Lee | H04L 47/801 709/226 |
| 2013/0091180 | A1* | 4/2013 | Vicat-Blanc-Primet | H04L 41/0893 707/803 |
| 2013/0091283 | A1* | 4/2013 | Omar | H04L 41/0893 709/226 |
| 2013/0242782 | A1* | 9/2013 | Szufarska | H04W 52/243 370/252 |
| 2013/0283043 | A1* | 10/2013 | Chen | H04L 63/0823 713/156 |
| 2014/0082612 | A1* | 3/2014 | Breitgand | G06F 9/45533 718/1 |
| 2014/0192717 | A1* | 7/2014 | Liu | H04L 67/16 370/328 |
| 2014/0279808 | A1* | 9/2014 | Strassner | G06Q 10/10 706/47 |
| 2015/0067061 | A1* | 3/2015 | Poston | H04L 67/20 709/204 |
| 2015/0234701 | A1* | 8/2015 | Irani | G06F 11/0793 714/15 |
| 2015/0245206 | A1* | 8/2015 | Le Rouzic | H04W 60/04 726/5 |
| 2016/0344772 | A1 | 11/2016 | Monahan et al. | |
| 2017/0070445 | A1* | 3/2017 | Zhang | H04L 47/70 |
| 2017/0091458 | A1 | 3/2017 | Gupta et al. | |
| 2018/0131757 | A1* | 5/2018 | Helmich | H04L 41/5041 |

OTHER PUBLICATIONS

Miltos D. Grammatikakis et al: "Security in MPSoCs: A NoC Firewall and an Evaluation Framework", Aug. 2015, IEEE, IEEE u Transactions on Computer-Aided Design of Integrated Circuits and Systems, vol. 34, No. 8, pp. 1344-1357 (Year: 2015) (Year: 2015).*
Robert N. M. Watson et al: "CHERI: A Hybrid Capability-System Architecture for Scalable Software Compartmentalization", 2015, IEEE, 2015 IEEE Symposium on Security and Privacy, pp. 20-37 (Year: 2015) (Year: 2015).*
Anderson, P. et al.; "Large-scale System Configuration LCFG and SmartFrog"; Jun. 6, 2003; 76 pages.
Gusmeroli, S. et al.; "A Capability-based Security Approach to Manage Access Control in the Internet of Things"; Sep. 2013; 38 pages.
Hadoop; "Zookeeper Dynamic Reconfiguration"; Feb. 12, 2017; 10 pages.
Scott, W.; "A Functional Approach to Authorization"; Jan. 18, 2015; 18 pages.
Bell et al., "OGF GFD-1.050 , CDDLM-WG, Configuration Description, Deployment, and Lifecycle Management (CDDLM) Foundation Document," Aug. 7, 2005, pp. 1-37.
Henry M. Levy, "Capability-Based Computer Systems", Digital Press, 1984, 229 pages.
Kramer et al., "The Conic toolkit for building distributed systems", IEE Proceedings D—Control Theory and Applications, vol. 134, No. 2, Mar. 1987, pp. 73-82.
Magee et al., An Overview of Distributed System Construction using Conic, The Application of Advanced Computing Concepts and Techniques in Control Engineering, Springer-Verlag, 1988, pp. 237-255.
WikiPedia, "SmartFrog", available online at <https://en.wikipedia.org/wiki/SmartFrog>, HP Labs, Feb. 14, 2018, 4 pages.

* cited by examiner

```
Capability CapabilityInstance {
        Attribute        Guaranteed|ATOMIC
        CPU              CPU=2;
        Memory           Size=200GB;
        Accelerator      Config {
                                Type     FPGA=2
                                Type     GPU=50
                                Type     DPE=30
                                Type     TPU=0
                                Type     ASIC=0
                         }
}
```

SYSTEMS AND METHODS FOR RECONFIGURATION CONTROL USING CAPABILITIES

TECHNICAL FIELD

The disclosed technology relates generally to computing system resource configuration, and more particularly some embodiments relate to using capabilities to dynamically, securely and programmatically manage computing system resource configuration.

DESCRIPTION OF THE RELATED ART

With the growth of the scale of computing, memory, and interconnects, and the introduction of new types of accelerators, system administrators have struggled to manage configuration and reconfiguration requests of system users and to partition resources for different users and applications in large scale systems. Configuration and reconfiguration are important for correct and secure operation of the computing system. Configuration has conventionally been managed using firmware or operating systems, generally with some degree of online addition and removal of components. Therefore, system reconfigurations generally required reboot or costly and inflexible operations to accomplish.

BRIEF SUMMARY OF EMBODIMENTS

One aspect of the present disclosure relates to a system configured for system reconfiguration of a computing system comprising a plurality of memory and computing resources. The system may include one or more hardware processors configured by machine-readable instructions. The processor(s) may be configured to assign a reconfiguration capability to a user. The reconfiguration capability may grant the user a right to reconfigure at least one of memory and computing resources in the computing system. A controller of the may computing system receiving a reconfiguration request from a user for a requested system reconfiguration along with that user's configuration capability. The controller of the may computing system verifying that the user from which the reconfiguration request was received has the rights to make the requested system reconfiguration. The controller of the system may execute the requested system reconfiguration if the user has the rights to make the requested system reconfiguration. A user's configuration capability may include a configuration description embedded in the same format used for reconfiguration of the computing system. The reconfiguration format may include one or more of an attribute class, a CPU count, a memory size and an accelerator configuration.

In some embodiments, the one or more hardware processors may further be configured by machine-readable instructions to the controller checking the requested system reconfiguration against a current valid configuration to determine whether the requested system reconfiguration can be fulfilled.

Executing the requested system reconfiguration may include programming firewalls that control access to the at least one of memory and computing resources in the computing system to alter partitions between those resources.

Another aspect of the present disclosure relates to a method for system reconfiguration of a computing system comprising a plurality of memory and computing resources. The method may include assigning a reconfiguration capability to a user. The reconfiguration capability may grant the user a right to reconfigure at least one of memory and computing resources in the computing system. A controller of the computing system may receive a reconfiguration request from a user for a requested system reconfiguration along with that user's configuration capability. The controller of the may computing system verifying that the user from which the reconfiguration request was received has the rights to make the requested system reconfiguration. The controller of the system may execute the requested system reconfiguration if the user has the rights to make the requested system reconfiguration.

In various embodiments, the method may further include the controller checking the requested system reconfiguration against a current valid configuration to determine whether the requested system reconfiguration can be fulfilled.

In still further embodiments, executing the requested system reconfiguration may include programming firewalls that control access to the at least one of memory and computing resources in the computing system to alter partitions between those resources.

In still further embodiments, a user's configuration capability may include a configuration description embedded in the same format used for reconfiguration of the computing system. The reconfiguration format may include one or more of an attribute class, a CPU count, and a memory size and an accelerator configuration. In still further embodiments, a user's configuration capability may include a configuration description of a flat space of capabilities with only one type of resource per capability.

In various embodiments, the method may further include the controller identifying existing partitions and failures within one or more of the existing partitions, and transferring loads from a partition with observed failures to a different partition.

The method may further include the controller examining current partitions and the controller reconfiguring one or more of the current partitions and one or more resources of the computing system to reallocate resources based on distance.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing the use of authorized capabilities for managing the configuration (including original configuration and reconfiguration) of system resources in large-scale computing systems. More particularly, some embodiments of the technology disclosed herein relate to using approved capabilities for dynamic, secure configuration that can be managed across a large-scale computing system by a system administrator.

Various embodiments employ capabilities to configure or reconfigure a computing system in which the agent requesting configuration or reconfiguration can do so only if it possesses capability to configure or reconfigure as appropriate. In some applications, grandparent capability may be originally created (e.g., at boot time) and may further be created such that it enables configuration or reconfiguration of the whole system. In other words, it may enable configuration or reconfiguration of multiple computing systems across a large-scale computing environment.

This grandparent capability can be used in various embodiments to derive capabilities for configuring (including reconfiguring) smaller partitions. Derived capabilities can be passed to additional agents, such as daemons running inside of partitions that can reconfigure existing or other partitions. In various applications, capabilities can encapsulate all resources with different attributes, such as dedicated resources (vs best effort) and atomic resources (which provide additional hardware colocation and hence generally a higher degree of security and performance). Approved capabilities are presented to a computing system controller and the controller verifies authenticity and authority of capability. Where the verification is positive, the controller executes the configuration within its domain to create the partition(s). Capabilities may be implemented to offer a flexible and secure way of configuring large scale heterogeneous systems.

Large scale computing systems may include a large quantity of nodes (e.g., numbering in the thousands), each of which may have associated resources. Some large-scale computing systems may employ processing resources, memory (including, e.g., persistent memory), accelerators, and other resources that are assignable to users at levels as may be requested by the users. Operating systems and kernels may be run on some or all of the nodes, and in some cases, different types, versions, or instances of kernels may be run on different nodes in the system. The system nodes and the resources therein may communicate with each other via distributed inter-node communication over a fabric. A system controller may be provided to arrange partitioning of system resources based on user demands. In some instances, large scale computing systems are set up as a virtual environment, with multiple virtual machines in place. In such cases, a hypervisor or virtual machine monitor (e.g., in the form of computer software, firmware or hardware) may be used to create and run the virtual machines in the virtual environment.

Figure 1:
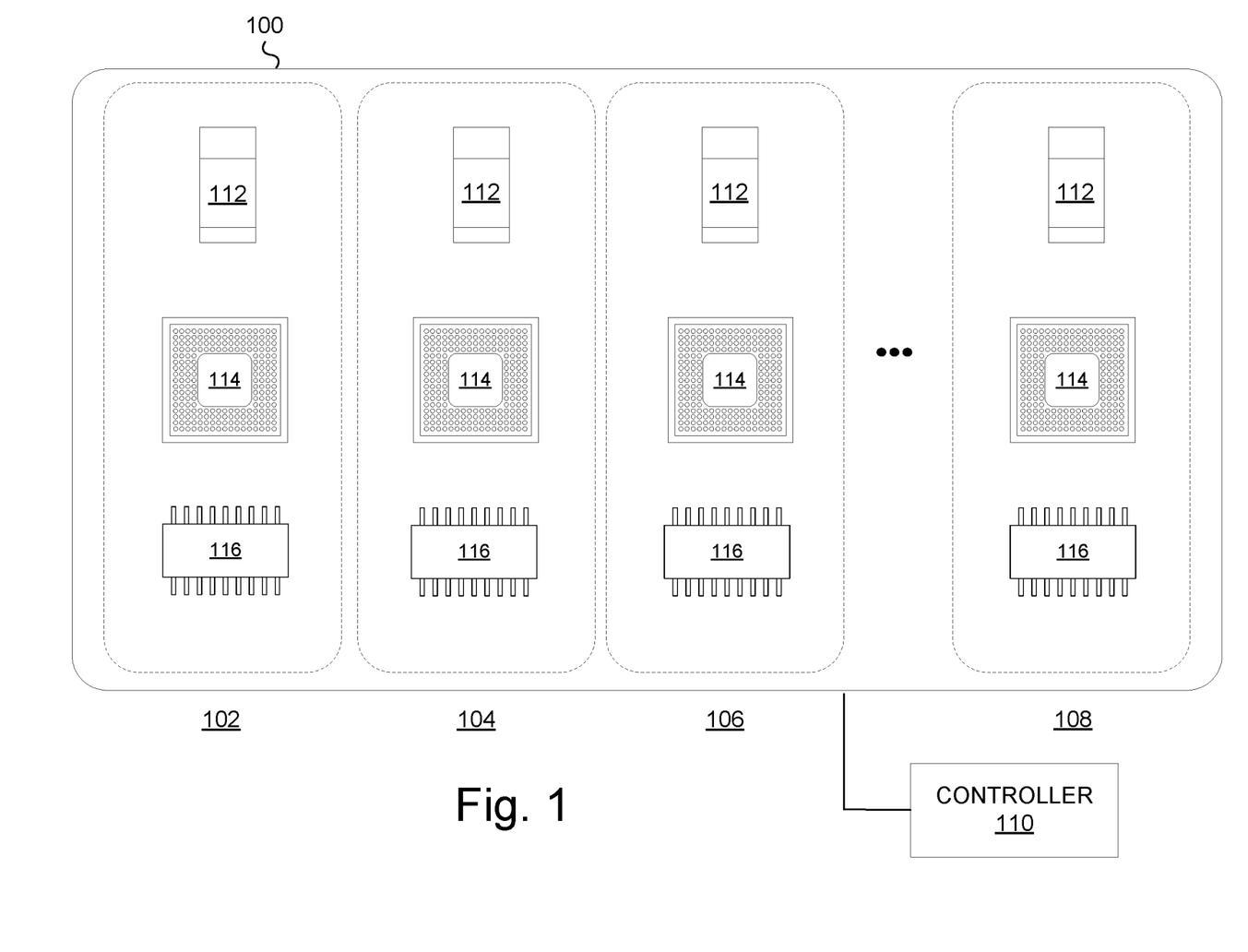
FIG. 1 depicts a block diagram of an example computing system architecture divided into multiple partitions, each including a set of hardware components, in accordance with various embodiments.

FIG. 1 depicts a block diagram of an example computing system architecture 100 divided into multiple partitions, each including a set of hardware components, in accordance with various embodiments. For example, the partitions may include partitions 102, 104, 106, 108, or any other quantity of partitions. Each partition may comprise a hardware environment operative to execute one or more operations of computer system 100. An operation may comprise an application, a program, and/or other computer operation executed partly or entirely by the environment of a single partition.

The hardware environment for each partition may comprise multiple hardware components configured to execute the one or more operations of computer system 100. For example, each partition may include one or more accelerators (identified in FIG. 1 as 112), one or more CPUs (identified in FIG. 1 as 114), one or more memory modules (identified in FIG. 1 as 116), and may include one or more other hardware components.

Figure 2:
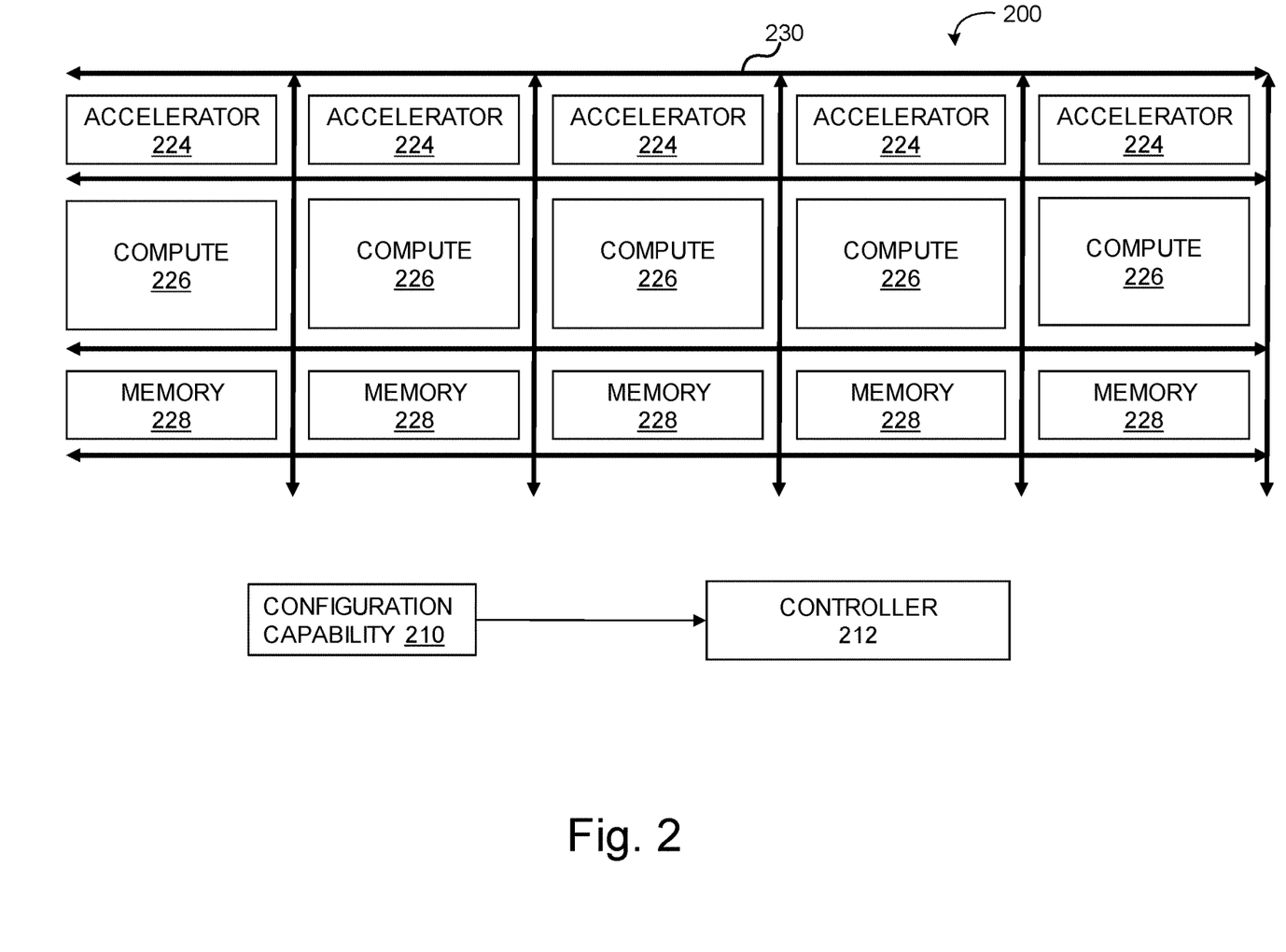
FIG. 2 provides another depiction of an example computing system architecture in accordance with various embodiments.

FIG. 2 provides another depiction of an example computing system architecture 230 in accordance with various embodiments. This example computing environment 200 includes a number of hardware elements within the computing environment interconnected by a fabric 230 that provides configurable interconnects between the various elements of the computing environment 200. The hardware elements in this example computing system 200 include accelerators 224, computation resources 226 and memory elements 228. In this example, there are 5 instances of each of accelerators 224, computation resources 226, and memory elements 228. However, in various applications there may be any quantity of each of these resources. Indeed, in large-scale computing systems there may be thousands of computing nodes distributed across a number of racks or even across a number of data centers.

The computation resources 226 can include any of a number of different types of computing resources including, for example, CPUs or other general processing will units, GPUs or other special processing units, and other processing resources. Accelerators 224 in some applications can serve both computing and memory functions as may be required.

The example of FIG. 2 also illustrates a controller 212 that can be used to control partitioning of the computing environment 200. Particularly, controller 212 can be configured to arrange fabric 232 partition the resources within the computing environment 200 into one or more partitioned groupings. In some embodiments as described herein, configuration capabilities 210 can be provided to controller 212 to identify the resources allocated to various users, which can be used to drive the partitioning.

Figure 3:
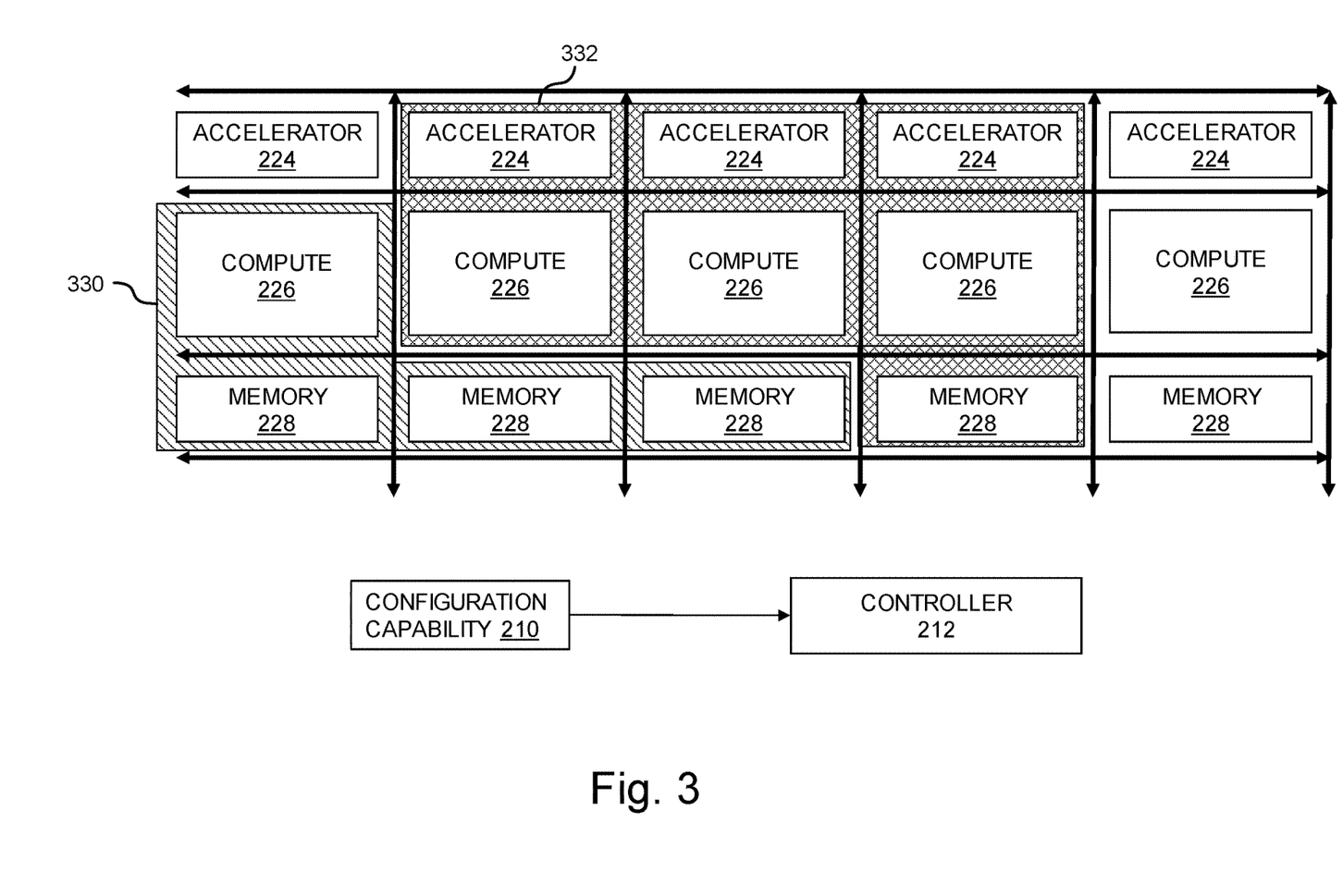
FIG. 3 depicts an example of the computing system of FIG. 2, partitioned with two example partitions in accordance with various embodiments.

FIG. 3 depicts an example of the computing system 200 of FIG. 2, partitioned with 2 example partitions in accordance with various embodiments. In this example, partition 1 330, includes one computing resource 226 and 3 memory blocks 228. Partition 2 332 includes 3 accelerators 224, 3 computation resources 226, and one memory block 228. As noted above, partitioning of these resources can be implemented by controller 212 based on one or more configuration capabilities 210 delivered to controller 212. As this example illustrates, any of a number of different partitioning operations can be made to partition the computing resources in accordance with user requests assuming the resources are available to accommodate the requests.

The partitions illustrated in this example show the resources in each partition grouped in blocks in which the resources of a given partition are adjacent to one another. This adjacency of resources of a given partition may be beneficial for system efficiencies, but is not required for partitioning. Resources from other non-adjacent locations within a computing system or from locations in other computing systems can be selected for a given partition. Indeed, in some instances this may be required depending on the availability of resources throughout the computing system. The controller 212 may also be given the ability to rearrange resources to make partitioning more efficient as resources become available.

Figure 4:
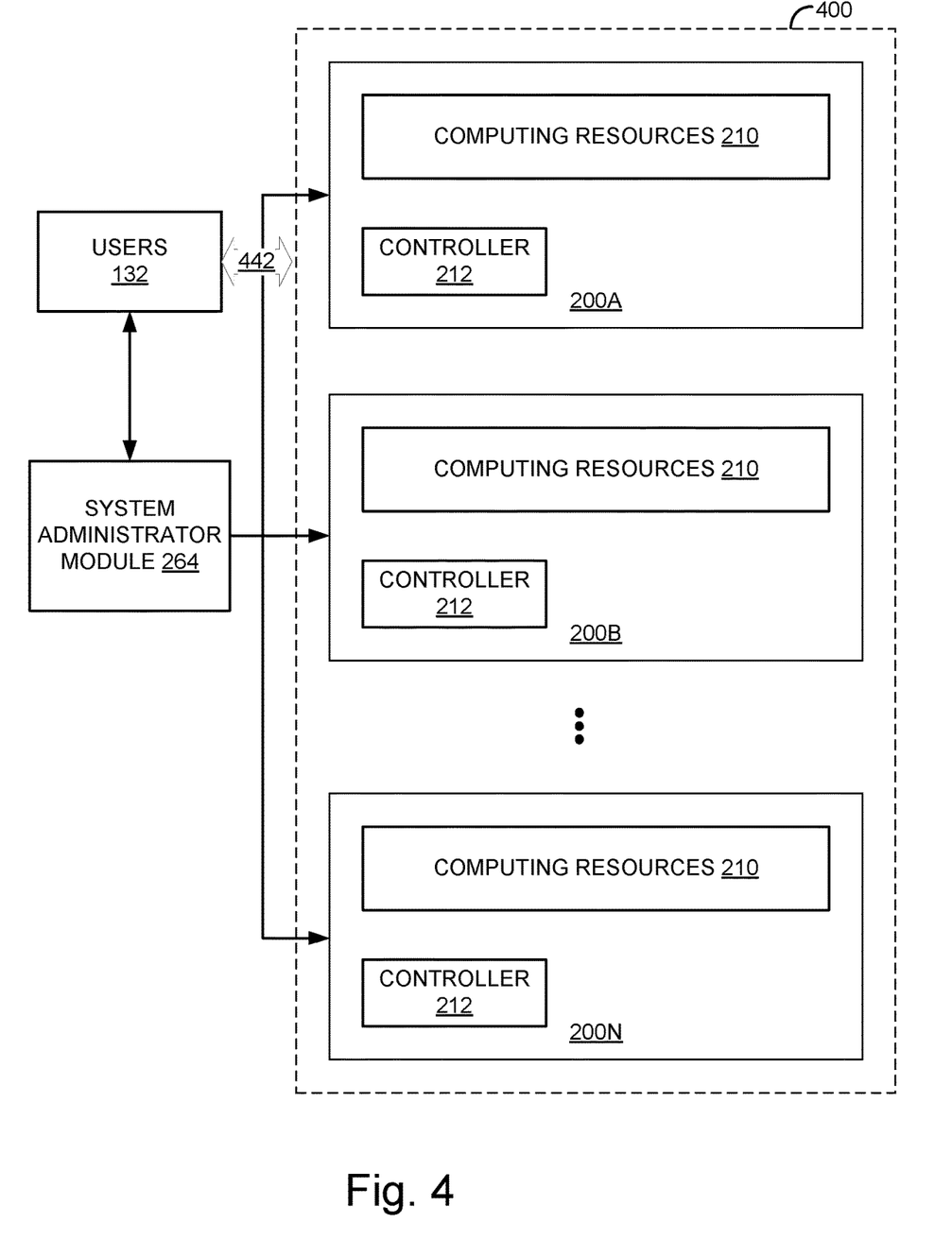
FIG. 4 is a block diagram illustrating an example of using capabilities to assign computing resources across a number of different computing environments using a single system administrator module to control resource assignment and direct configuration and reconfiguration of the computing resources into appropriate partitions.

FIG. 4 is a block diagram illustrating an example of using capabilities to assign computing resources across a number of different computing environments using a single system administrator module to control resource assignment and direct configuration and reconfiguration of the computing resources 210 into appropriate partitions. This example illustrates partitioning across N computing systems 200 (200A through 200N). In this example, system users 132 provide configuration requests to the system administrator module 264. The configuration requests may include a user's request for hardware resources of the computing environment 400.

Figure 5:
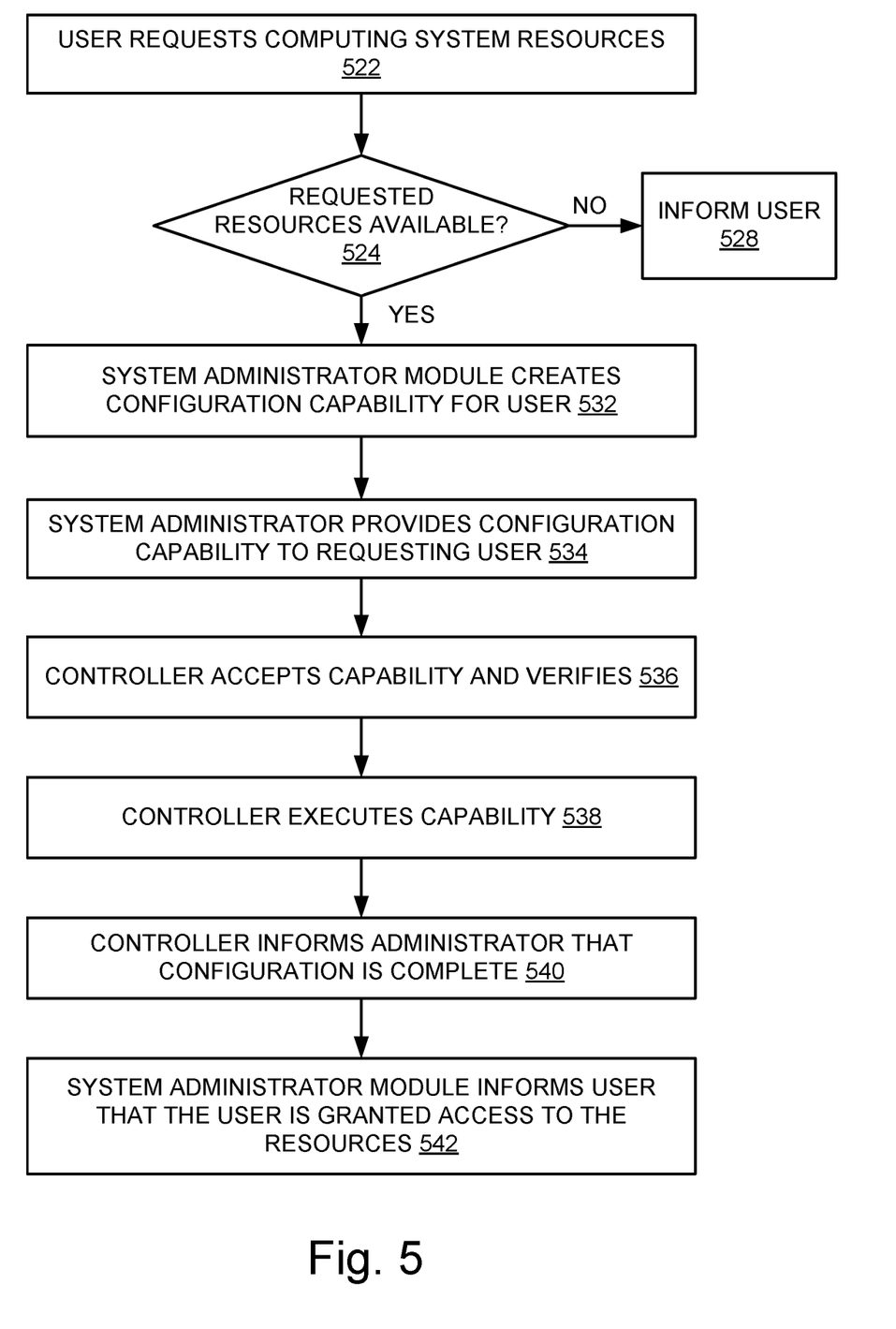
FIG. 5 is an operational flow diagram illustrating one example of using capabilities for configuration in accordance with various embodiments.

FIG. 5 is an operational flow diagram illustrating an example of using capabilities for configuration in accordance with various embodiments. For context, the example processes of FIG. 5 is discussed in terms of the example computing systems in FIGS. 1-4. With reference now to FIG. 5, at operation 522 a user requests resources of the computing system. The user can make these requests to computing system (e.g., computing system 400), which are delivered to a system administrator module of the computing system (e.g. system administrator module 264).

At operation 524, the system administrator module may in some embodiments first verify that the requested resources are available before creating the configuration capability for the user. In some applications, this verification can be performed by the system administrator module itself, in which case the system administrator module may keep a record of all assigned resources. In other applications, this verification can be performed by polling the various controllers in the computing system (e.g., one or more controllers 212 in computing system 400) to determine from these controllers whether they have resources available to fulfill the request. In other embodiments, other capabilities within the computing system may verify resource availability.

If the requested resources are not available, the system administrator module may inform the user of the lack of availability of one or more resources in the request. This information can include specifics about which resources are unavailable so that the user may reformulate a request if appropriate. This is illustrated at operation 528.

If the resources are available, at operation 532, the system administrator module creates a configuration capability for the user. In various embodiments, the configuration capability identifies the resources to be allocated to the user and also provides authentication and verification that the user is authorized to be provided access to those resources.

In some embodiments, at operation 534, the system administrator provides the configuration capability to the requesting user. The user may then pass the created configuration capability to the controller for allocation of resources to the user. In other embodiments, the system administrator may pass the created configuration capability to the controller.

At operation 536, the controller accepts the capability, interprets the information contained in the capability to determine the resources requested by the capability and verifies that the requester has the rights to configure the resources as requested by the capability. The controller may also verify that the capability is physically executed (e.g., that all dependencies and requirements are met). The controller may also verify that the requested capability conforms to any system policies that may be in place. For example, configuration policies may require that certain amounts of memory be allocated with each processing unit assigned. Accordingly, the controller may verify that the requested capability includes sufficient memory for the processing resources requested, and if not, it may deny the request.

Assuming that the requested capabilities are verified, at operation 538, the controller executes the capability. Executing the reconfiguration in accordance with the capability may include adjusting the fabric (e.g. fabric 230) to provide the appropriate connections to create the partitioning. This operation may include, for example, programming firewalls that allow access to memory or that control communications between system elements such as CPUs, accelerators, and memory to create the partitions. An example of partitions that can be created is illustrated above and described with reference to FIG. 3.

In some embodiments, the controller may not allocate all of the resources requested by a capability in response to the initial request. Instead, in some instances the controller may allocate a subset of the resources in response to the capability request and defer or delay allocating other resources until such time as the user is actually using the allocated resources. In other words, resources can be phased in as the user's actual usage demands.

At operation 540, the controller may report back to the system administrator module that the configuration according to the capability has been implemented. At operation 542, the system administrator module informs the user that the configuration is complete and that the user has access to the resources. The user may then access the computing environment and the resources assigned to that user. An example of this is illustrated at arrow 442 (FIG. 4).

The capabilities can also identify the user for whom the resources are being allocated. Accordingly, when the user accesses the system to access his or her assigned resources, the user can be authenticated against the capability to ensure that the user attempting access has the appropriate rights to the resources. Accordingly, this can provide an additional measure of security to the system. Additionally, a non-forgeable characteristic of configuration capabilities can be achieved similarly to Capability Hardware Enhanced RISC Instructions (CHERI) capabilities using a hidden bit in memory. The hidden bit can be used to identify that the byte or bytes that it flags are configuration capabilities. Accordingly, the capabilities can be implemented as non-forgeable tokens of authority associated with the requesting user.

Because the bid can be hidden, unintended recipients will have difficulty or may even be unable to determine that the information contains capabilities. In other embodiments such as where this is not supported, the controller can be implemented to track which actor holds a particular capability and then interpose on each configuration request and each delegation. Using this technique, the controller may be configured to verify if the request comes from an authorized requester or not.

In various applications, the controller maintains the current valid configuration and can match whether requests can be fulfilled. For example, if the locality of the batch (CPU, memory, accelerators) is critical but it cannot be fulfilled, a failure notification may be returned. Otherwise, if the online reconfiguration can be accomplished and it is allowed for the requestor, it may be executed.

In various implementations of the systems and methods disclosed herein, the users can also be given the ability to pass their assigned capabilities on to others. Accordingly, resources assigned through capabilities can be delegated or reassigned to other users assuming that the original users are given permission to do so. Likewise, capabilities can be revoked by the system. Revocation can be accomplished by updating the allocation records and the controller reconfiguring system resources to accomplish the revocation.

Figure 6:
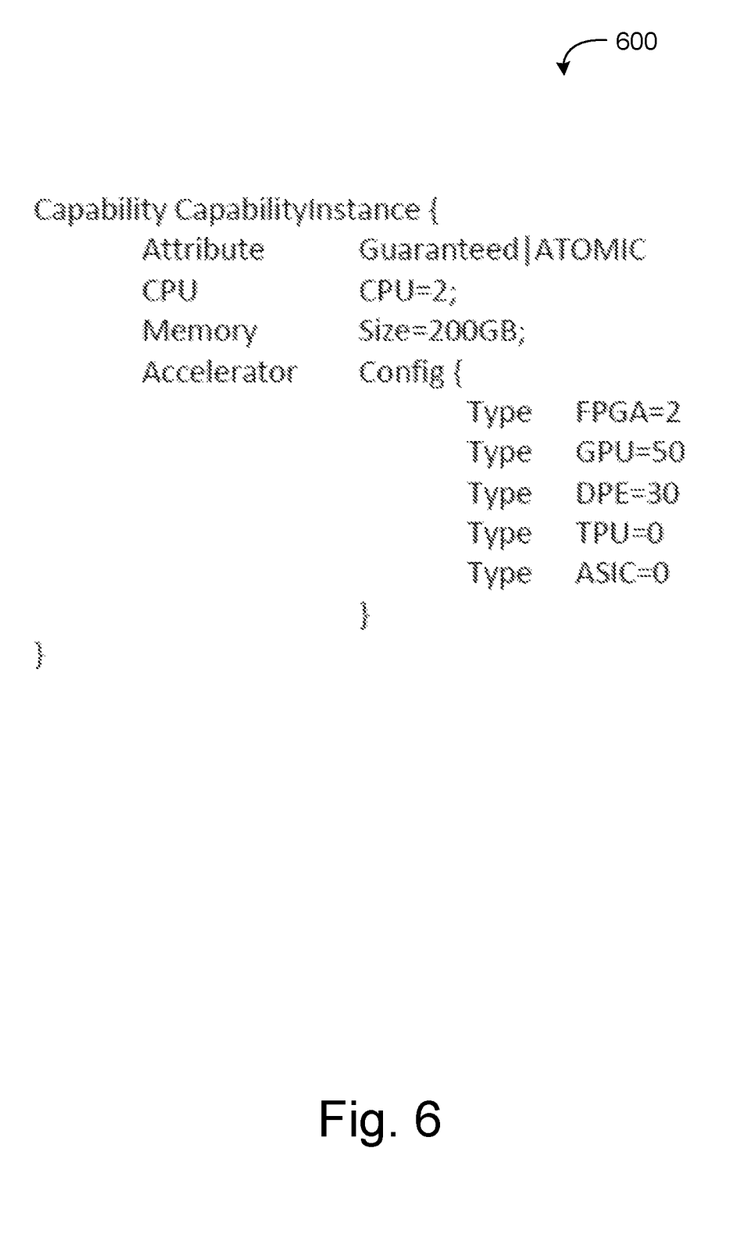
FIG. 6 illustrates one example of a capability with a configuration description in accordance with various embodiments.

Capabilities described herein can include a configuration description for a desired configuration of computing resources. In some embodiments, this may be achieved by embedding the configuration description in the capability in a format that can be used for configuring the system. One example of a capability with a configuration description is illustrated in FIG. 6 in accordance with various embodiments. In this example, the configuration description includes attributes of the configuration (in this case Guaranteed Atomic), the type and quantity of processing units assigned, the memory to be assigned, and the accelerator configurations.

In other applications, the configuration description can be accomplished by providing a flat space of capabilities with only one type of resource per capability, and the configuration can be achieved by combining the capabilities. This may have implications on how the configurations are executed in the capabilities could be, for example, guaranteed or reserved capabilities, best efforts capabilities (e.g., the user has a right to request, but the request will only be granted if the available configuration exists) atomic capabilities (e.g. all requested resources are in sufficiently close physical proximity to each other in accordance with security or performance requirements). Using such an approach, there may be circumstances in which a composite (e.g. combined) complex capability might not be able to be fulfilled for various reasons, but simpler capabilities from that composite might be fulfilled.

As noted above with reference to FIG. 5, there may be circumstances in which a controller may reconfigure existing partitions based on resource availability, performance efficiency, and so on. In some embodiments, the controllers can be configured to reconfigure partitions as a consequence of failures, performance requirements, scale imbalance, application or workload mismatches, and so on. This can be implemented, for example, by allowing the controller to observe partitions and determine whether it would be possible and useful to move one or more of the loads from partitions with partial failures or other performance issues to other parts of the system by reconfiguring the existing partitions into new partitions. As another example, as mentioned above, the controller may be implemented to reconfigure partitions to provide closer proximity of resources within a partition, which may have the benefit of improving performance, security, or other attributes of the resources in the partition. In further embodiments, the controller may be able to evaluate statistics, or provide statistics to an external agent for evaluation to determine whether it would be beneficial to repartition the system or reallocate resources within partitions to meet performance, security, reliability, service guarantees or other system metrics.

Figure 7:
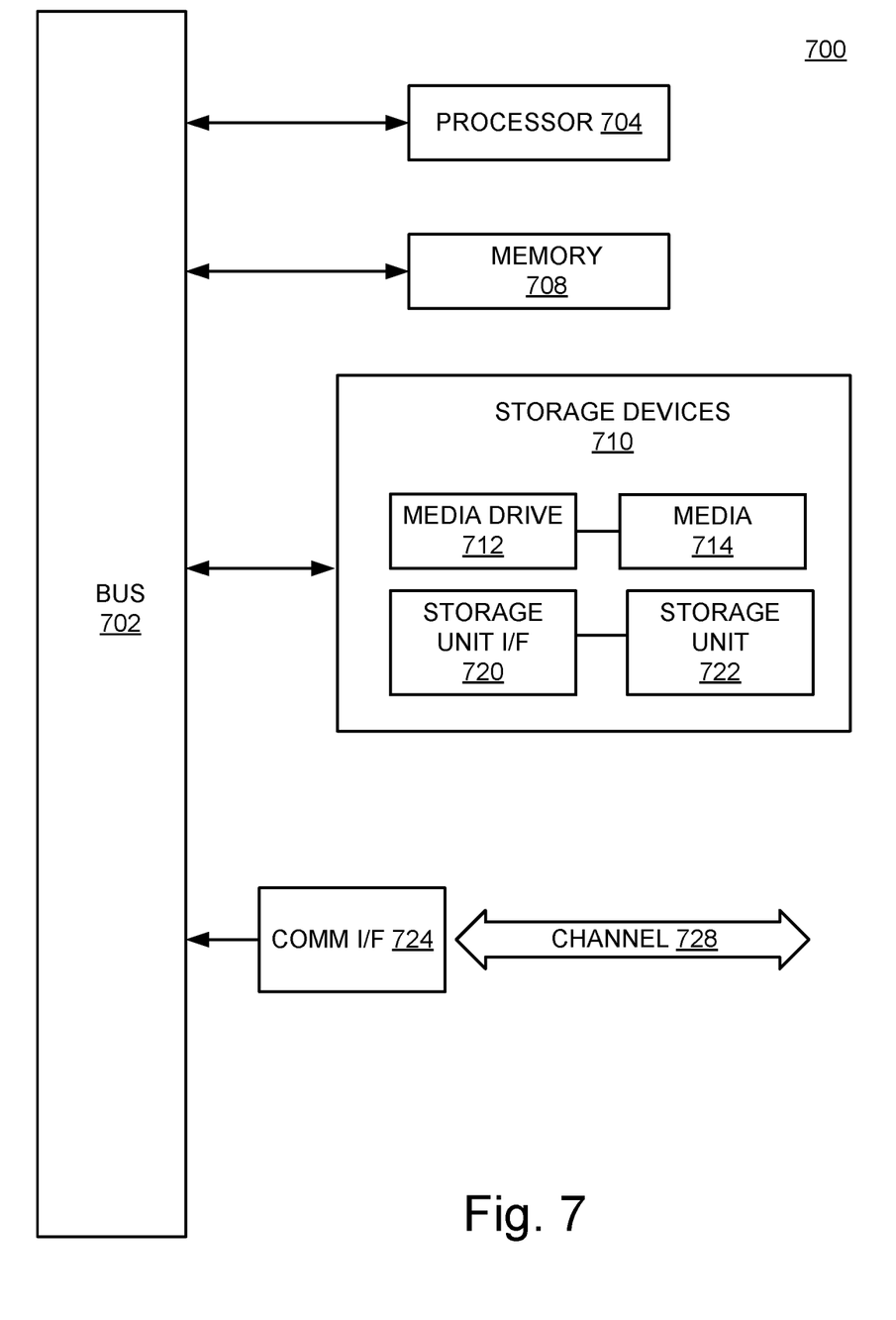
FIG. 7 illustrates an example computing module that may be used in implementing various features of embodiments of the disclosed technology.

As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where modules are implemented in whole or in part using software, in one embodiment, these software elements can be implemented to operate with a computing or processing system capable of carrying out the functionality described with respect thereto. One such example computing system is shown in FIG. 7. Various embodiments are described in terms of this example-computing system 700. After reading this description, it will become apparent to a person skilled in the relevant art how to implement the technology using other computing systems or architectures.

Referring now to FIG. 7, computing system 700 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 700 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to realize the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for system reconfiguration of a computing system comprising a plurality of memory and computing resources, the method comprising:
    receiving a request for at least one of the memory and computing resources in the computing system;
    verifying the at least one of the memory and computing resources in the computing system are available;
    assigning a reconfiguration capability to a user, the reconfiguration capability granting the user a right to reconfigure the at least one of the memory and computing resources in the computing system, responsive to the verifying;
    a controller of the computing system to:
        store an identification of an actor that holds the reconfiguration capability,
        receive a reconfiguration request from the user for a requested system reconfiguration along with a configuration capability of the user,
        interpose the identification of the actor on the reconfiguration request,
        compare the identification of the actor that holds the reconfiguration capability with the user from which the reconfiguration request was received to verify the right to reconfigure the computing system; and
        upon determining that the actor and the user match, execute the requested system reconfiguration.

2. The method of claim 1, further comprising the controller checking the requested system reconfiguration against a current valid configuration to determine whether the requested system reconfiguration can be fulfilled.

3. The method of claim 1, wherein executing the requested system reconfiguration comprises programming firewalls that control access to the at least one of memory and computing resources in the computing system to alter partitions between those resources.

4. The method of claim 1, wherein a user's configuration capability comprises a configuration description embedded in the same format used for reconfiguration of the computing system.

5. The method of claim 4, wherein the reconfiguration format comprises an attribute class, a CPU count, and a memory size.

6. The method of claim 4, wherein the reconfiguration format comprises an attribute class, a CPU count, a memory size and an accelerator configuration.

7. The method of claim 1, wherein a user's configuration capability comprises a configuration description of a flat space of capabilities with only one type of resource per capability.

8. The method of claim 1, further comprising the controller identifying existing partitions and failures within one or more of the existing partitions, and transferring loads from a partition with observed failures to a different partition.

9. The method of claim 1, further comprising the controller examining current partitions and the controller reconfiguring one or more of the current partitions and one or more resources of the computing system to reallocate resources based on distance.

10. A system configured for system reconfiguration of a computing system comprising a plurality of memory and computing resources, the system comprising:
    one or more hardware processors configured by machine-readable instructions to:
        receive a request for at least one of the memory and computing resources in the computing system;
        verify the at least one of the memory and computing resources in the computing system are available; and
        assign a reconfiguration capability to a user, the reconfiguration capability granting the user a right to reconfigure the at least one of the memory and computing resources in the computing system, responsive to the verifying;
    a controller of the computing system to:
        track an identification of an actor that holds the reconfiguration capability;
        receive a reconfiguration request from the user for a requested system reconfiguration along with a configuration capability of the user;
        interpose the identification of the actor on the reconfiguration request;
        compare the identification of the actor that holds the reconfiguration capability with the user from which the reconfiguration request was received to verify the right to reconfigure the computing system; and
        upon determining that the actor and the user match, execute the requested system reconfiguration.

11. The system of claim 10, wherein the one or more hardware processors are further configured by machine-readable instructions to the controller checking the requested system reconfiguration against a current valid configuration to determine whether the requested system reconfiguration can be fulfilled.

12. The system of claim 10, wherein executing the requested system reconfiguration comprises programming firewalls that control access to the at least one of memory and computing resources in the computing system to alter partitions between those resources.

13. The system of claim 10, wherein a user's configuration capability comprises a configuration description embedded in the same format used for reconfiguration of the computing system.

14. The system of claim 13, wherein the reconfiguration format comprises an attribute class, a CPU count, and a memory size.

15. The system of claim 13 wherein the reconfiguration format comprises an attribute class, a CPU count, a memory size and an accelerator configuration.

16. The system of claim 13 wherein a user's configuration capability comprises a configuration description of a flat space of capabilities with only one type of resource per capability.

17. The system of claim 13 further comprising identifying existing partitions and failures within one or more of the existing partitions, and transferring loads from a partition with observed failures to a different partition.

18. The system of claim 13 further comprising examining current partitions and the controller reconfiguring one or more of the current partitions and one or more resources of the computing system to reallocate resources based on distance.

19. The system of claim 10, wherein the one or more hardware processors are further configured by machine-readable instructions to:
the controller further to:
programmatically reconfigure the at least one of the memory and computing resources in the computing system as a consequence of a failure to meet a performance requirement in current system configurations.

20. The system of claim 10, wherein the one or more hardware processors are further configured by machine-readable instructions to:
the controller further to:
automatically observe partitions of the system;
decide that it is possible to move some of the loads from partitions with partial failures to other parts of the system by reconfiguring the existing partitions; and
execute reconfiguring of the existing partitions.

* * * * *